June 27, 1933.  R. WISHON  1,915,638
INTERNAL COMBUSTION ENGINE
Filed Oct. 6, 1930
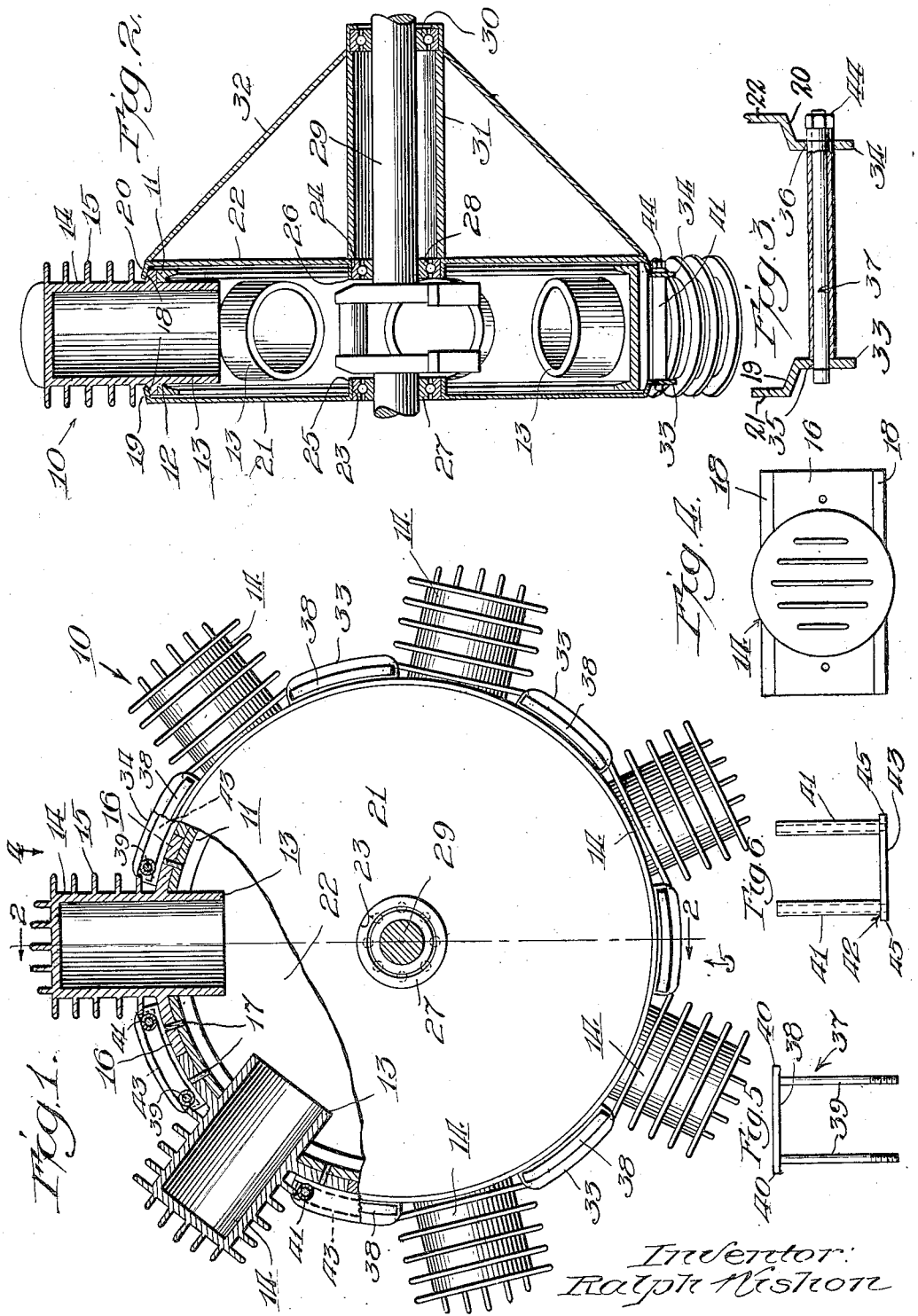
Inventor:
Ralph Wishon
By Rector, Hibben, Davis & Macauley
Attys Patented June 27, 1933

1,915,638

UNITED STATES PATENT OFFICE

RALPH WISHON, OF CHICAGO, ILLINOIS, ASSIGNOR TO PACKARD MOTOR CAR COMPANY, OF DETROIT, MICHIGAN, A CORPORATION OF MICHIGAN

INTERNAL COMBUSTION ENGINE

Application filed October 6, 1930. Serial No. 486,559.

My invention relates to internal combustion engines and is concerned primarily with an improved manner of securing the crank case and cylinders together.

An object of my invention is to devise a light-weight engine crank case composed of sections which are arranged and secured together and which fasten the cylinders therewith in a manner such that the crank case is statically loaded to eliminate any possible reversal of forces during operation.

A further object is to provide an engine construction in which the crank, case and cylinders are attached together by substantially a wedging action whose degree of tightness may be regulated as desired.

A further object is the provision of a construction of the character described and preferably one comprising a drum type of crank case with the engine cylinders disposed radially therearound, the latter being secured in position by disc-like, end sections of the case which are under tensional stress, greater than that developed therein by the maximum explosive force operating in any cylinder.

A further object is to provide an engine construction in which the crank case may be formed of members having relatively thin sections, such as pressed steel and in which the machining is reduced to a minimum, the engine being therefore particularly adaptable for aircraft operation because of its light weight and capable of manufacture at relatively low cost.

The orthodox manner of attaching separately formed cylinders to engine crank cases consists generally in the use of bolts or similar threaded fastening means, such as studs, which are customarily mounted in the case and extend through suitable perforations in the cylinder flanges. However, this type of fastening subjects the crank case to periodic tensile loads whose area of distribution is encompassed roughly within the region of the fastening means for each cylinder. Fastenings of this nature do not present any serious operation problems when used in engines having a relatively low compression ratio, such as carburetion engines, but have not been found satisfactory in engines having a relatively high compression ratio, such as compression-ignition or solid fuel injection engines, unless the crank case is provided with relatively heavy sections to resist the tensile stresses in question. Increasing the wall thickness of the crank case, however, adds to the weight of the engine and obviously affects the weight-power ratio of the engine in an adverse manner, but in aircraft engines, such as the present invention more particularly contemplates, it is particularly desired not only to avoid any increase in the engine weight, but to actually secure a decrease in weight consistent with a proper observance of strength requirements.

In effectuating the above, the present invention proposes the attachment of the cylinders to the crank case and their retention in position by means which provides for a satisfactory distribution of the stresses arising during engine operation. These stresses ordinarily result from explosion forces in the cylinders, side thrusts of the pistons, and ensuing vibrations. In the present instance, the crank case has substantially the aspect of a drum, from the lateral surface of which seatably project in radial directions the several cylinders of the engine. The end sections are provided with flanges which overlie suitably formed flanges formed on the cylinders and tightening means are provided for securing the desired retaining engagement of the flanges on the end sections with the flanges on the cylinders, these tightening means establishing in the indicated sections a predetermined tensional stress which operates across the faces thereof and is initially set up to a figure considerably beyond any pressure that may be developed in the cylinders due to the expansion of the explosive mixtures after combustion. The cylinders are accordingly held to their respective seats under all conditions of engine operation with an adequate factor of safety. Kindred compressive stresses are also established in the crank case member interposed between the end sections.

These and further objects of my invention will be set forth in the following specification, reference being had to the accompanying drawing, and the novel means by which said objects are effectuated will be definitely pointed out in the claims.

In the drawing,

Figure 1 is a front elevation, partly in section, of an internal combustion engine embodying the present invention.

Fig. 2 is a sectional view along the line 2—2 in Fig. 1, looking in the direction of the arrows.

Fig. 3 is an enlarged section of the lower end of the engine, as viewed in Fig. 2 showing the manner of tightening the end sections of the crank case to more firmly grip the flanges on the engine cylinders.

Fig. 4 is a plan view of one of the engine cylinders, as viewed in the direction of the arrow 4 in Fig. 1.

Fig. 5 is an elevation of the bolt member of the securing means, as viewed in the direction of the arrow 5 in Fig. 1.

Fig. 6 is an elevation of the sleeve member of the securing means, as viewed in the direction of the arrow 5 in Fig. 1.

The numeral 10 represents generically a seven-cylinder, radial type, internal combustion engine which may employ either the compression ignition or the solid fuel injection system of operation. The crank case of the engine 10 comprises a circular ring 11 having substantially a channel section with the flanges thereof turned inwardly, as shown in Fig. 2. The peripheral surface of the ring 11 is pierced at equi-spaced distances by a plurality of holes 12, within which project the usual skirts 13 of engine cylinders 14. These cylinders may be provided with the ordinary cooling ribs 15 and also with any desired means (not shown) of injecting the fuel thereinto and the necessary auxiliary attachments.

Each cylinder 14 is provided with a pair of oppositely extending flanges 16, 16 (see Fig. 1) which extend in opposite directions and are appropriately curved to conform to the curvature of, and seat on, the ring 11. The width of the flanges 16 is greater than the diameter of the holes 12, and preferably extend in width at least to the sides of the flanges provided on the ring 11. The end faces of the flanges 16 on each cylinder are disposed in abutting relation with the corresponding faces on the flanges of an adjoining cylinder and rotary motion of each cylinder in a plane normal to the axis thereof is prevented by a pair of dowel pins 17, one end of each of which is mounted in the ring 11 and with the opposite end extending through an adjacent flange 16.

The outer surface of the flanges 16 is provided with a pair of beveled surfaces 18 which taper downwardly and away from the associated cylinder, as viewed in Fig. 2, and which extend the full length of the side edges of said flanges. Overlying the beveled surfaces 18 are peripheral flanges 19 and 20 formed, respectively, on end sections 21 and 22 which constitute the end members of the engine crank case and which are preferably formed of relatively thin metal, such as steel. The end sections 21 and 22 are substantially disc-like in appearance and are provided with centrally disposed holes 23 and 24, respectively, which are defined, respectively, by inwardly turned, annular flanges 25 and 26, within which are carried, respectively, the rear main crank bearing 27 and the front main crank bearing 28. The ordinary crank shaft 29 is mounted in the indicated bearings, the left end of said shaft, as viewed in Fig. 2, extending beyond the end section 21 for attachment to any suitable starting mechanism, not shown. The opposite end of said shaft is carried in a combined thrust and radial bearing, represented generically by the numeral 30 in Fig. 2, which bearing is carried in one end of a spacer tube 31, the opposite end of which may be suitably attached, as by welding or by other means, to the end section 22. A frustro conical section 32, which functions substantially as a strut member, extends between the periphery of the end member 22 and the spacing tube 31, being secured thereto by any approved means.

In order to retain the several cylinders 14 in the positions shown against the high pressure present during operation, the following instrumentalities are employed in order to tightly engage the peripheral flanges 19 and 20 with the cylinder flanges 16. At convenient locations around the periphery of the end sections 21 and 22, and preferably disposed symmetrically with respect to the abutting end faces of the cylinder flanges 16, is a plurality of outwardly extending ears 33 and 34 formed, respectively, on the end sections 21 and 22. Adjacent the ends of each ear 33, a pair of holes 35 is provided and holes 36, similarly positioned with respect to the holes 35, are formed in the ears 34. Extending through the holes 35 is a substantially U-shaped, clip bolt 37 having a base 38 which is intended to engage with the outer surface of the ear 33 and with which base member is integrally formed a pair of bolt members 39, 39 which extend through the holes 35. The ends of the base member 38 preferably extend beyond their junction with the bolt members 39 to provide the projecting portions 40, 40 (see Fig. 5) in order to establish a more efficient contact with the surface of the ear 33 when the bolt 37 is drawn up tightly as hereinafter described. The bolt members 39 are intended to be received within the limb portions 41 of a substantially U-shaped, sleeve member 42 having a base member 43, the limb portions 41 extending through the holes 36 of the ear 34, with the ends of the bolt members 39 projecting beyond the base member 43 to receive thereon nuts 44.

As with the bolt 37, the sleeve member 43 is also provided with projecting portions 45 which extend beyond the junctions of the base 43 with the sleeve portions 41. The base portions 38 and 43 of the bolt structures are clamped tightly against the flanges 33 and 34 so that stress is distributed along the contacting surfaces thereof and will not be localized around the shank portions of the bolt structures.

In assembling the engine, the cylinders 14 are first placed in the appropriate holes 12 and doweled in position by the pins 17. Thereafter, the end sections 21 and 22 are placed in position, followed by an insertion of the bolts 37 and sleeves 43. The bolts 39 are then tightened to thereby cause the peripheral flanges 19 and 20 to ride upwardly along the beveled surfaces 18 on the cylinder flanges for tightly retaining the several cylinders in position by substantially a wedging movement and also to establish a predetermined tensional stress across the end sections 21 and 22, the action being closely analogous to the tightening of the skin heads of a drum. These stresses operate across the sections in question and are initially set up to a point which is considerably greater than any stress which can be developed in the sections by operative pressure which may obtain in the several cylinders.

As the initial tensional stress in the sections 21 and 22 is greater than that developed therein by maximum operation or explosive forces, the crank case will be statically loaded and thus any possible reversal of forces, tending to cause fatigue therein during operation of the engine, is eliminated. It will thus be seen that with a statically loaded crank case, such as has been herein described, stressing of the crank case can be greater than stressing caused by possible variations or reversal of stresses during operation of the engine, and therefore a statically loaded crank case can be formed of thinner material, and hence of lighter weight, than when fatigue stresses must be taken into account, and it is well-known that fatigue stresses must be taken into account if the crank case is not statically loaded.

For sake of further illustration and explanation, let us assume that with the engine illustrated the maximum explosion force in each cylinder is 18,200 pounds, the crank case is 20″ in diameter with the wall sections 21 and 22 of $\frac{1}{10}$″ in thickness, the two flange edges of each cylinder which engage with the crank case are 9″ long making a total of 18″ bearing surface, and the initial tension in which the sections 21 and 22 are placed is 15,000 pounds per square inch when the structure is assembled, such tension being entirely possible when steel is used. Under such circumstances, the area of the sections 21 and 22 taking the explosion load of each cylinder is $1\frac{8}{10}$ square inches which produces approximately 10,000 pounds per square inch tension stress in each of the two wall sections. As each of the wall sections 21 and 22 is under an initial tension stress of 15,000 pounds per square inch, then the 10,000 pounds per square inch tension stress created by explosion and operation forces will fail to cause reversal of forces because the condition of static loading is present. With such static loading of the walls 21 and 22, a much thinner wall can be employed than when fatigue stresses must be taken into account and, under such circumstances, a lighter engine can be built.

The inclined nature of the contact between the cylinder flanges and the peripheral flanges 19 and 20 permits any degree of tightness to be established between the indicated surfaces, within the limits of the maximum strength of the material. The construction is therefore highly flexible and permits of ready adaptation to a variety of engine types and sizes. An engine constructed in the foregoing manner may be manufactured with a minimum of machining and, being constructed of relatively light sections, its weight power ratio will be low and it will therefore be particularly desirable for aircraft service. Moreover, the cylinders may be conveniently removed for any purpose.

While I have shown one set of elements and combinations thereof for effectuating my improved engine, it will be understood that the same is intended for purpose of illustration only and in no wise to restrict my structure to the exact forms and arrangements shown, for many changes may be made therein without departing from the spirit of my invention.

I claim:

1. In an engine, the combination of a crank case having a center section and end wall sections, a cylinder, flanges extending from the cylinder engaging with the center section of the crank case and having exterior inclined surfaces, flanges on the end wall sections having inclined surfaces co-operating with the inclined cylinder flange surfaces in the manner of a wedge, and means for drawing said co-operating inclined surfaces into a wedging position establishing a predetermined tensional stress in said end wall sections which is in excess of that resulting from engine operating forces.

2. In a radial engine, the combination of a drum-shaped crank case comprising a center section and end wall sections, a plurality of cylinders having portions bearing against the center section of the crank case, means for securing said cylinders in position on the crank case comprising parts on the end wall sections co-operating with the parts of the cylinders bearing against the crank case by a wedging action, and means for drawing the end wall parts toward each other and into tight engagement with the cylinder parts, such engagement being sufficient to initially stress the end wall sections more than the stress developed therein by operating forces of the engine.

3. In a radial engine, the combination of a crank case comprising end members and a spacer member separating said end members, a plurality of cylinders disposed around and bearing against the periphery of said spacer member, parts on said cylinders and end members cooperating substantially by wedging action to retain said cylinders in position, and creating a higher tensional stress in the end members than that developed by operation forces of the engine, and means for drawing said parts tightly into engagement.

4. In a radial engine, the combination of a crank case comprising end members and a spacer member separating said end members, a plurality of cylinders disposed around and bearing against the periphery of said spacer member, and parts on said cylinders and end members formed as cooperating inclined surfaces for mutual engagement in the manner of a wedge to secure said cylinders in position and to initially stress the end members to a greater extent than that to which they are subjected by explosion forces, and means for drawing said parts tightly into engagement.

5. In a radial engine, the combination of a crank case comprising end members and a spacer member separating said end members, a plurality of cylinders disposed around and bearing against the periphery of said spacer member, said end members having a relatively thin section, parts on said cylinders and end members cooperating substantially in a wedging action to retain said cylinders in position, and means for drawing said parts tightly into engagement to establish a predetermined tensional stress in the walls of said end members which is greater than that developed therein by explosion forces.

6. In a radial engine, the combination of a crank case comprising end members having a relatively thin section and a spacer member separating said end members, a plurality of cylinders disposed around and bearing against the periphery of said spacer member, parts on said cylinders and end member formed substantially as cooperating inclined surfaces for mutual engagement in the manner of a wedge to retain said cylinders in position, and means for drawing said parts tightly into engagement to establish a predetermined tensional stress in the walls of said end members which is greater than that developed therein by explosion forces.

7. In a radial engine, the combination of an open-ended, cylindrical section, a plurality of cylinders disposed around and having flanges resting on said section, end sections forming with said cylindrical section the crank case of the engine and having flanges engaging with said cylinder flanges to retain said cylinders in position, and means for holding said end sections in position and stressing them more than the stresses developed by explosion forces.

8. In a radial engine, the combination of an open-ended, cylindrical section, a plurality of cylinders disposed around and having flanges resting on said section, said flanges having an inclined surface, end sections forming with said cylindrical section the crank case of the engine and having inclined flanges engaging with the inclined surfaces of said cylinder flanges, and means for drawing both sets of flanges tightly together to retain said cylinders in position and initially stressing the end sections to a greater extent than that developed therein by explosion forces.

9. In a radial engine, the combination of an open-ended, cylindrical section, a plurality of cylinders disposed around and having flanges resting on said section, relatively thin, end sections, said flanges having a beveled edge forming with said cylindrical section the crank case of the engine and having inclined flanges engaging with the beveled edges of said cylinder flanges, and means for drawing both sets of flanges tightly together to retain said cylinders in position and to establish a predetermined tensional stress in said end sections greater than that developed therein by engine operating forces.

10. In a radial engine, the combination of an open-ended, cylindrical section, a plurality of cylinders disposed around and having flanges resting on said section, the end faces on adjacent cylinder flanges abutting each other, end sections forming with said cylindrical section the crank case of the engine and having flanges engaging with said cylinder flanges to retain said cylinders in position, and means for holding said end sections in position, and initially stressing the end sections more than they are stressed by engine operation forces.

11. In a radial engine, the combination of an open-ended, cylindrical section, a plurality of cylinders disposed around and having flanges resting on said section, said flanges having a beveled edge, end sections forming with said cylindrical section the crank case of the engine and having inclined flanges engaging with said cylinder flanges along the beveled edges thereof, ears formed on said inclined flanges, and bolts connecting said ears for drawing both sets of flanges tightly together to retain said cylinders in position and stressing the end sections more than they are stressed by explosion forces.

12. In a radial engine, the combination of an open-ended, cylindrical section, a plurality of cylinders disposed around and having flanges resting on said section, said flanges having a beveled edge, end sections forming with said cylindrical section the crank case of the engine and having peripheral, inclined flanges engaging with said cylinder flanges on the beveled edges thereof, elongated ears formed on said peripheral flanges having a pair of bolt holes, and U-shaped clip bolts passing through said holes for connecting said ears and drawing the same tightly into engagement with said beveled edges to retain said cylinders in position.

13. In a radial engine, the combination of an open-ended, cylindrical section, a plurality of cylinders disposed around and having flanges resting on said section, said flanges having a beveled edge, the end faces on adjacent cylinder flanges abutting each other, end sections forming with said cylindrical section the crank case of the engine and having peripheral, inclined flanges engaging with the beveled surfaces of said cylinder flanges, elongated ears having bolt holes and formed on said peripheral flanges for symmetrical disposition with reference to said abutting faces, and bolts passing through said holes for connecting said ears and drawing the same tightly into engagement with said beveled edges to retain said cylinders in position.

14. In a radial engine, the combination of a drum-shaped crank case comprising a cylindrical center section and thin wall end sections having peripheral flanges inclined in facing relation, a plurality of cylinders disposed around and bearing against said center section and having beveled flanges engageable with said peripheral flanges, and means for drawing the peripheral flanges of said end sections toward each other to secure said cylinders in position and to establish a predetermined tensional stress in said end sections.

15. In a radial engine, the combination of a drum-shaped crank case comprising a center member and end members having a relatively thin, wall section, a plurality of cylinders mounted around said center member, means for securing said cylinders in position comprising parts on said cylinder and end members cooperating substantially by a wedging action with the cylinder parts engaging the center member, and means for drawing said parts tightly into engagement and for establishing a tensional stress in said end members in excess of that developed by the maximum pressure operating in any of said cylinders.

16. In a radial engine, the combination of a drum-shaped crank case comprising a center section and relatively thin, cup-shaped end sections having inclined peripheral flanges, a plurality of cylinders mounted around the periphery of said center section and having seating flanges bearing against the center section and provided with beveled surfaces, said peripheral flanges having a retaining engagement with said seating flanges, and means for drawing said flanges tightly into engagement with each other, establishing tensional stress in said end members in excess of that developed therein by maximum operating forces.

17. In a radial engine, the combination of a drum-shaped crank case comprising a center section and relatively thin, cup-shaped end sections having inclined peripheral flanges, a plurality of cylinders mounted around the periphery of said center section and having seating flanges bearing against the center section and provided with beveled surfaces, said peripheral flanges having a retaining engagement with said seating flanges, and bolts mounted on said peripheral flanges and spanning said seating flanges for drawing both of said flanges tightly into engagement with each other and establishing tensional stress in said end members in excess of that developed therein by maximum operating forces.

18. In a radial engine, the combination of an open-ended, cylindrical section, a plurality of cylinders disposed around and having flanges resting on said section, said flanges having a beveled edge, end sections forming with said cylindrical section the crank case of the engine and having peripheral, inclined flanges engaging with said cylinder flanges on the beveled edges thereof elongated ears formed on said peripheral flanges having a pair of bolt holes, the ears of said end sections facing each other in associated pairs, U-shaped clip bolts passing through the holes in the ears of one of said end sections, and U-shaped clip sleeves passing through the holes in the ears of the other of said end sections, said bolts being insertable through said sleeves, and nuts on the projecting ends of said bolts for tightly drawing said peripheral flanges into engagement with said beveled edges to retain said cylinders in position.

19. In a radial engine, the combination of an open-ended, cylindrical section, a plurality of cylinders disposed around and having flanges resting on said section, said flanges having a beveled edge, the end faces on adjacent cylinder flanges abutting each other, end sections forming with said cylindrical section the crank case of the engine and having peripheral, inclined flanges engaging with the beveled surfaces of said cylinder flanges, elongated ears having bolt holes and formed on said peripheral flanges for symmetrical disposition with reference to said abutting faces, and U-shaped clip bolts passing through said holes for connecting said ears and drawing said peripheral flanges tightly into engagement with said beveled edges to retain said cylinders in positions.

In testimony whereof, I have subscribed my name.

RALPH WISHON.